3,033,790
LUBRICATING COMPOSITION
Richard C. Nelson, Walnut Creek, Calif., assignor to Shell Oil Company, New York, N.Y., a corporation of Delaware
No Drawing. Filed June 17, 1958, Ser. No. 742,505
9 Claims. (Cl. 252—51.5)

This invention relates to improved liquid hydrocarbon compositions and particularly to compositions of the type of fuels, lubricants and greases having enhanced properties of color stability, oxidation resistance, and detergency and the like.

Until recently, hydrocarbon compositions were doped with various oil-soluble metal salts such as polyvalent metal sulfonates, carboxylates, phenates, phosphates, thiocarbamates, and the like. Although some of these substances such as the sulfonates, phenates and carboxylates possess detergent properties, other phenates and thiocarbamates are useful because of their corrosion inhibiting properties and still others (phosphates) are useful as antioxidants, in general, these metallic compounds, when subjected to high temperatures and pressure conditions, break down and act as pro-oxidants, causing deterioration of the oil base and result in corrosion, wear, etc. To overcome these and other defects certain non-ash forming oxygen and/or nitrogen-containing polymeric additives have been introduced, but these generally lack wear inhibiting and extreme pressure properties as well as good high temperature oxidation inhibiting properties. Also, these non-ash forming polymeric compounds when used in oils containing metallic compounds, such as metal sulfonate, phenates or carboxylates, tend to complex with them and cause sludging.

It has now been found that liquid hydrocarbon compositions are improved with respect to wear inhibition, detergency, oxidation stability, compatibility with oils containing metallic compounds and the like by incorporating therein a minor amount of an oil-soluble polymeric compound having essentially a long linear hydrocarbon backbone chain and attached thereto in a uniform or random fashion two essential groups, one being an oil-solubilizing oleophilic hydrocarbon radical, preferably an alkyl radical having an average of between 8 and 20 carbon atoms, preferably 10–18, bonded indirectly thereto through an oxygen-containing polar group such as an ester or an amide group and the other being a polar containing group —$CH_2$—X, wherein X is a polar group such as hydroxy, carboxyl, cyano, sulfo, amine, amide or carbamyl, preferably a hydroxyl, an amine, an amide or a carbamyl group.

Oil-soluble polymers of this type are prepared by reacting an allyl compound, e.g., allyl alcohol, allyl ester, allyl amine or an allyl amide and a polymerizable ester or amide having an oleophilic radical such as a long alkyl radical of at least 8, preferably from 10 to 18 carbon atoms, such as $C_{10-20}$-alkyl esters of acrylic or methacrylic acids, vinyl esters of long chain fatty acids having at least 8 carbon atoms, N-$C_{10-20}$-alkyl acrylamides, and mixtures thereof. Copolymers of allyl compounds and long chain alkyl esters of acrylic acids, such as esters of methacrylic acid and $C_8$-$C_{20}$ fatty acids, are preferred.

The mol ratio of the allyl compound to the oleophilic ester or amide can vary within relatively wide limits, e.g., from 1:1 to 15:1, preferably from 5:1 to 10:1, respectively, and the polymer may have suitable molecular weights of from about 1,500 to over one million, preferably between 10,000 and 100,000.

The copolymerization may be carried out in the presence of a suitable oxygen-yielding initiator, such as a suitable peroxide or azo compound and at temperatures varying from room temperature to about 150° C.

The allyl compounds used to form the copolymers, inter alia, include allyl alcohol, methallyl alcohol, allyl acetate, allyl propionate, allyl butyrate, methallyl acetate, allyl amine, N,N-diethyl allylamine, N-allyl aniline, allyl formamide, esters of allyl alcohol and a carbamic acid, e.g. allyl acetamide, allyl carbamate, N,N-diethyl allyl carbamate, and mixtures thereof.

Polymerizable monomers containing oleophilic components containing an aliphatic hydrocarbon chain of at least 8 carbon atoms which is not part of the main hydrocarbon polymer chain includes polymerizable esters, and/or amides of unsaturated acids. Suitable esters include acrylic and alkacrylic esters of aliphatic alcohols of at least 8 carbon atoms, preferably of from 10 to 20 carbon atoms, and include, inter alia, decyl acrylate, lauryl acrylate, stearyl acrylate, eicosanyl acrylate, docosanyl acrylate, decyl methacrylate, lauryl methacrylate, cetyl methacrylate, stearyl methacrylate, and the like, and mixtures thereof.

Other substances include the vinyl esters of long-chain carboxylic acids such as vinyl laurate, vinyl palmitate, vinyl stearate, vinyl oleate and the like and mixtures thereof; long-chain esters of vinylene dicarboxylic acids such as methyl lauryl fumarate; and methyl stearyl maleate, N-long chain hydrocarbon substituted amides of unsaturated acids such as N-stearyl methacrylamide, N-lauryl methacrylamide, N-stearyl acrylamide and the like. These components can be employed alone or in various combinations. The technical lauryl methacrylate obtained from the commercial mixture of long chain alcohols in the $C_{10}$ to $C_{18}$ range derived from coconut oil is an especially useful oleophilic component of the copolymer. The group of acrylic and alkacrylic esters of aliphatic alcohols of at least eight carbon atoms are, in general, well suited as the oleophilic component of the copolymer.

The copolymers of allyl or methallyl alcohols and esters of methacrylic acid and $C_{10-18}$ fatty acids, e.g., lauryl and/or stearyl methacrylate are preferred. Copolymers of this type can be prepared by polymerizing an ester of acrylic or methacrylic acid such as lauryl or stearyl methacrylate with an excess of allyl alcohol or by hydrolyzing copolymers of allyl esters, such as allyl acetate or propionate, and an ester of methacrylic acid such as lauryl methacrylate. The method of preparing copolymers by the latter process is to hydrolyze copolymers obtained by reacting an oleophilic-containing monomer, such as a long chain alkyl ester of an acrylic acid, e.g., lauryl or stearyl methacrylate with a large excess of an allyl ester such as allyl acetate or allyl propionate. At least 70%, preferably over 90%, of the allyl ester groups should be converted to free hydroxyl groups.

The following examples are given as representative embodiments of the invention.

*Example I*

To 29.5 moles of allyl alcohol at 80–100° C. were added each hour for seven hours 0.343 mole of lauryl methacrylate (2.744 moles and 0.00793 mole) of alpha, alpha'-azodi-iso-butyronitrile. After eight hours' polymerization, the unreacted monomers were removed by distillation, and the oil-soluble copolymer had a molecular weight of about 10,000.

*Example II*

10 moles of allyl acetate and 1 mole of lauryl methacrylate were reacted in the presence of ditertiary butyl peroxide at 80–100° C. for 2 to 8 hours.

The copolymer was then mixed with a mixture of methanol and ethanol and sodium methacrylate so as to effect a 95% conversion of the acetate group to hydroxyl groups. The sodium acetate formed was removed by washing with isopropanol-water mixture and the resulting oil-soluble copolymer had a molecular weight of about 50,000.

The following examples further illustrate polymeric additives used in compositions of the present invention.

| Example | Catalyst | Temp, °C. | Mole Ratio of Allyl C'pd/Oleophilic Monomer | Degree of Hydrolysis | Mol Wt. |
|---|---|---|---|---|---|
| III | benzoyl peroxide | 100 | allyl alcohol (10)/stearyl methacrylate (1) | | 25,000 |
| IV | do | 100 | allyl alcohol (15)/mixture of lauryl and stearyl methacrylate (1) in ratio of 3:1. | | 30,000 |
| V | ditertbutyl peroxide | 115 | allyl alcohol (10)/N-stearyl methacrylamide | | 10,000 |
| VI | do | 115 | allyl alcohol (10)/lauryl methacrylate | | 20,000 |
| VII | do | 115 | allyl acetate (10)/lauryl acrylate | 90 | 22,000 |
| VIII | benzoyl peroxide | 80 | methallyl acetate (10)/stearyl acrylate | 90 | 10,000 |
| IX | do | 100 | allylamine (10)/lauryl methacrylamide | | 15,000 |
| X | do | 85 | allyl alcohol (12)/vinyl stearate | | 10,000 |
| XI | do | 100 | allyl carbamate (10)/lauryl methacrylate | | 15,000 |

Polymeric products of this invention are outstanding additives for various liquid hydrocarbon products, such as natural and synthetic hydrocarbon lubricating oils, greases, fuels (gasoline, gas oil, burner fuel oil), asphalts, waxes, slushing oils, industrial oils, e.g., metal working and drawing oils, quenching oils, textile oils, dielectric compositions and other industrial oils. They are particularly outstanding when added in small amounts to lubricating oils and lubricating compositions to impart detergency and anti-wear properties to such materials. Also, these additives are particularly outstanding additives for fuel oils.

Lubricating bases for additives of this invention can be any natural or synthetic hydrocarbonaceous material having lubricating properties. Thus, the base may be a hydrocarbon oil of wide viscosity range, e.g., 100 SUS at 100° F. to 150 SUS at 210° F. The hydrocarbon oils may be blended with fixed oils such as castor oil, lard oil and the like, and/or with synthetic lubricants such as polymerized olefins, copolymers of alkylene glycols and oxides; organic esters of polybasic organic and inorganic acids, e.g., di-2-ethylhexyl sebacate, dioctyl phthalate, trioctyl phosphate; polymeric tetrahydrofuran; polyalkyl silicone polymers, e.g., dimethyl silicone polymer and the like.

Mineral lubricating oils which have been utilized in evaluating the utility of the present additives meet the following specifications:

| | I | II |
|---|---|---|
| Gravity, °API | Min. 26.5 | Min. 24.5 |
| Pour Point, °F | Max. 10 | Max. −5 |
| Flash, COC, °F | Min. 490 | Min. 415 |
| Viscosity, SUS at 210° F | 120–125 | 60–63 |
| Viscosity Index | Min. 95 | 50–60 |

Fuel oils which are greatly improved by the addition thereto of a minor amount of additives of this invention are of the type described in U.S. Patents 2,639,227 and 2,672,408. The additives of this invention prevent discoloration and inhibit clogging tendencies, both phenomena being common to such fuel oils which contain cracked and straight run fractions. An added feature of additives of this invention is that they resist leaching and inhibit formation of emulsions when fuel oils or lubricating oils come in contact with water. Conventional color stabilizers and anti-clogging agents generally do not possess these properties.

The polymeric compounds of this invention are generally added in minor amounts of from 0.001% to 10%, preferably from 0.01% to 1% by weight, depending upon the base composition to which they are added and the purpose for which they are added. In lubricants the additives can be used in amounts of from 0.02 to 1%, while in fuel compositions considerably less can be used, generally between 0.005% and 0.02% by weight.

Compositions of this invention can be modified by addition thereto of minor amounts (0.01–2%) of pour point depressants, viscosity index improvers, blooming agents, corrosion inhibitors, oiliness agents, solubilizers, and the like. Among such materials are high molecular weight polymers, e.g., "Acryloids," which are polymeric esters of methacrylic acid and long chain fatty alcohols, e.g. mixtures of wax-naphthalene condensation products, isobutylene polymers, alkyl styrene polymers; inorganic and organic nitrites such as $NaNO_2$ and diisopropylammonium nitrite and dicyclohexylammonium nitrite; organic phosphites, phosphates and phosphonates such as trichloroethyl phosphite, tricresyl phosphate, dilorolphosphate, phosphorus sulfide-olefinic reaction products such as $P_2S_5$-terpene reaction products, metal organic phosphates, e.g. Ca or Zn dicyclohexylthiophosphate or 2-ethylhexyl-thiophosphate; organic sulfides, e.g., wax disulfide, ethylene bistolyl sulfide; amines, e.g., octadecylamine and the like. Also, phenolic antioxidants such as 2,6-ditertiary-4-methyl phenol and 2,2'-methylene bis(4-methyl-6-tertiarybutylphenol) as well as conventional metallic detergents of the sulfonate and phenate class exemplified by alkali and alkaline earth organic sulfonates and phenates, e.g. Na, basic Ca or basic Ba petroleum sulfonate and Na, Ca, Ba, or Zn cetyl phenate, basic Ca or basic Ba $C_{14}$–$C_{18}$ alkyl salicylate and Ca, Ba or Zn salt of octyl phenol-formaldehyde condensation product, etc., can be used in conjunction with the polymers of this invention.

The improvement imparted to oils by polymers of this invention is shown by the following test results. To a mineral oil (150 SUS 210° F.) having an L-1 engine rating for top ring groove filling of 100(100=poor, 0=perfect) and an EX-3 engine cleanliness rating of 53 (100=perfect, 50=poor) was added 10% basic calcium petroleum sulfonate and 0.75% zinc dihexyl dithiophosphate (composition X) and the EX-3 rating was increased to 65. However, when 1% of additive of Example I was added to composition X (composition A) the EX-3 rating was increased to 70. A mineral oil (150 SUS 210° F.) containing 10% basic calcium petroleum sulfonate, 1.2% zinc dihexyldithiophosphate and 5% copolymer of lauryl methacrylate/2-methyl-5-vinyl pyridine (composition Y) gave an L-1 rating of 85, however, when the vinyl pyridine copolymer in composition Y was replaced with 1% of additive of Example I (composition B) the L-1 rating was reduced to 10. The L-1 engine test is described in the CRC-Handbook and the EX-3 engine test (6 cylinder) is essentially the same as described in SAE preprint 1B, Detroit, Meeting Jan. 15–17, 1958.

When various amounts of from 0.1% to 10% of the polymeric of Examples II to X are incorporated in various mineral oils such as SAE 10, 20, 30, 10W–30 and similarly tested as noted above, beneficial results are obtained as a result of the polymeric additives of this invention.

I claim as my invention:

1. A hydrocarbon oil containing a minor amount, sufficient to stabilize and impart detergency to the oil, of an oil-soluble copolymer selected from the group consisting of (A) hydrolyzed copolymer of an allyl ester and an acrylic ester of an aliphatic alcohol having at least eight carbon atoms and (B) a copolymer of (1) an allyl compound selected from the group consisting of allyl alcohol, allyl amine and allyl carbamate and (2) an acrylic ester of an aliphatic alcohol having at least eight carbon atoms, in the mol ratio of (1) and (2) of from 1:1 to 15:1, respectively, said copolymer having a molecular weight of at least 1500.

2. A mineral lubricating oil containing a minor amount, sufficient to stabilize and impart detergency to the oil, of an oil-soluble copolymer of allyl alcohol and a $C_{10-18}$-alkyl acrylate in the mol ratio of 1:1 to 15:1, respectively, and having a molecular weight of at least 1500.

3. A mineral lubricating oil containing a minor amount, sufficient to stabilize and impart detergency to the oil of an oil-soluble hydrolyzed copolymer of allyl acetate and a $C_{10-18}$-alkyl methacrylate, in the mol ratio of 1:1 to 15:1, respectively, and having a molecular weight of at least 1500.

4. A mineral lubricating oil containing a minor amount, sufficient to stabilize and impart detergency to the oil, of an oil-soluble copolymer of allyl alcohol and lauryl methacrylate in the mol ratio of 1:1 to 15:1, respectively, and having a molecular weight of at least 1500.

5. The lubricating composition of claim 4 containing a minor amount of a metallic detergent selected from the group consisting of oil-soluble alkali and alkaline earth metal organic sulfonate and alkali and alkaline earth metal phenate.

6. A mineral lubricating oil containing a minor amount, sufficient to stabilize and impart detergency to the oil, of an oil-soluble copolymer of allyl carbamate and a $C_{10-18}$-alkyl methacrylate, in the mol ratio of 1:1 to 15:1, respectively, and having a molecular weight of at least 1500.

7. The lubricating composition of claim 6 containing a minor amount of a metallic detergent selected from the group consisting of oil-soluble alkali and alkaline earth metal organic sulfonate and alkali and alkaline earth metal phenate.

8. A mineral lubricating oil containing a minor amount, sufficient to stabilize and impart detergency of the oil, of an oil-soluble copolymer of allyl carbamate and lauryl methacrylate, in the mol ratio of 15:1 to 1:1, respectively, and having a molecular weight of at least 1500.

9. The lubricating composition of claim 8 containing a minor amount of a metallic detergent selected from the group consisting of oil-soluble alkali and alkaline earth metal organic sulfonate and alkali and alkaline earth metal phenate.

References Cited in the file of this patent

UNITED STATES PATENTS

| | | |
|---|---|---|
| 2,600,383 | Bauer et al. | June 17, 1952 |
| 2,600,421 | Neher et al. | June 17, 1952 |
| 2,600,446 | Van Horne et al. | June 17, 1952 |
| 2,600,448 | Van Horne et al. | June 17, 1952 |
| 2,800,450 | Bondi et al. | July 23, 1957 |
| 2,800,452 | Bondi et al. | July 23, 1957 |
| 2,800,453 | Bondi et al. | July 23, 1957 |
| 2,892,783 | Stuart et al. | June 30, 1959 |

FOREIGN PATENTS

| | | |
|---|---|---|
| 758,203 | Great Britain | Oct. 3, 1956 |
| 759,517 | Great Britain | Oct. 17, 1956 |
| 759,918 | Great Britain | Oct. 24, 1956 |

OTHER REFERENCES

"A New Class of Polymeric Dispersants for Hydrocarbon Systems," by Biswell et al., presented at American Chemical Society meeting at Kansas City, Missouri, March 23 to April 1, 1954, pub. by E. I. du Pont de Nemours & Company, 3-54, page 3.